United States Patent
Griffin et al.

(10) Patent No.: US 8,220,732 B2
(45) Date of Patent: Jul. 17, 2012

(54) DEFOLIATING AND SHREDDING STORAGE DEVICE FOR AROMATIC HERBS AND METHOD FOR USE

(76) Inventors: Jeremy Griffin, Northridge, CA (US); Jacob Griffin, Northridge, CA (US)

(*) Notice: Subject to any disclaimer, the term of this patent is extended or adjusted under 35 U.S.C. 154(b) by 170 days.

(21) Appl. No.: 12/645,438

(22) Filed: Dec. 22, 2009

(65) Prior Publication Data
US 2011/0147505 A1    Jun. 23, 2011

(51) Int. Cl.
*A01D 34/90* (2006.01)
*A47J 42/00* (2006.01)

(52) U.S. Cl. .............. 241/169.1; 241/199.12; 241/285.2

(58) Field of Classification Search .............. 241/285.2, 241/169.1, 199.12
See application file for complete search history.

(56) References Cited

U.S. PATENT DOCUMENTS

| | | | | |
|---|---|---|---|---|
| 795,746 | A * | 7/1905 | Wingfield & Balding | ... 206/238 |
| 2,602,596 | A * | 7/1952 | James et al. | ............... 241/169.1 |
| 2,690,881 | A * | 10/1954 | Mantelet | ..................... 241/152.1 |
| 3,581,790 | A * | 6/1971 | Conte | ......................... 241/88.1 |
| 4,212,430 | A | 7/1980 | Dale et al. | |
| 4,366,930 | A | 1/1983 | Trombetti, Jr. | |
| 5,007,592 | A * | 4/1991 | Poncy | ........................ 241/169.1 |
| 5,071,663 | A * | 12/1991 | Dugan | ........................ 426/112 |
| 5,322,227 | A | 6/1994 | Fiocchi | |
| 5,660,342 | A | 8/1997 | Bock | |
| 5,865,384 | A | 2/1999 | Pai | |
| 6,412,717 | B1 * | 7/2002 | Menelaou | ....................... 241/92 |
| 6,663,031 | B2 | 12/2003 | Henderson et al. | |
| 6,834,817 | B2 * | 12/2004 | Manson | ..................... 241/169.1 |
| 7,422,170 | B2 * | 9/2008 | Bao | ............................... 241/168 |
| 2,726,816 | A1 | 12/2009 | Brantley | |
| 2003/0015611 | A1 * | 1/2003 | Teng | ......................... 241/169.1 |
| 2007/0262182 | A1 * | 11/2007 | de Groote et al. | ......... 241/169.1 |

* cited by examiner

*Primary Examiner* — Bena Miller
(74) *Attorney, Agent, or Firm* — Ken Dallara; Law Office of Ken Dallara

(57) ABSTRACT

A device, and method for use of the device, is disclosed that optimizes the proper preparation of fresh herbs for culinary or other uses. The device incorporates both a unique shredding means and storage of the herbs in one device. It is important in the preparation of fresh herbs that there is an absence of grinding or pulverizing due to the release of essential aromatic oils onto the surfaces of the grinder. Fresh herbs need to be shredded or torn. This device also defoliates the herb leaves from the stems.

10 Claims, 5 Drawing Sheets

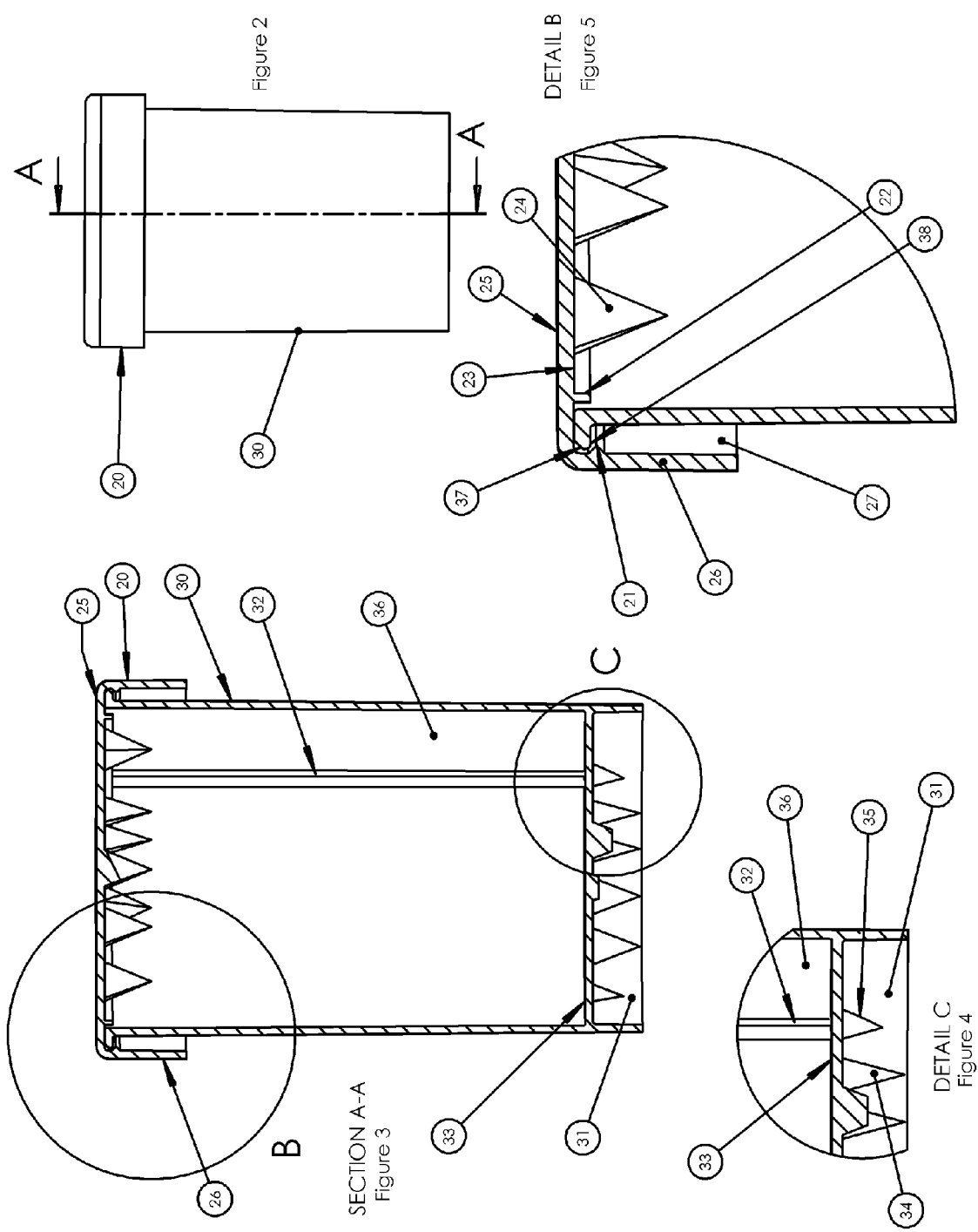

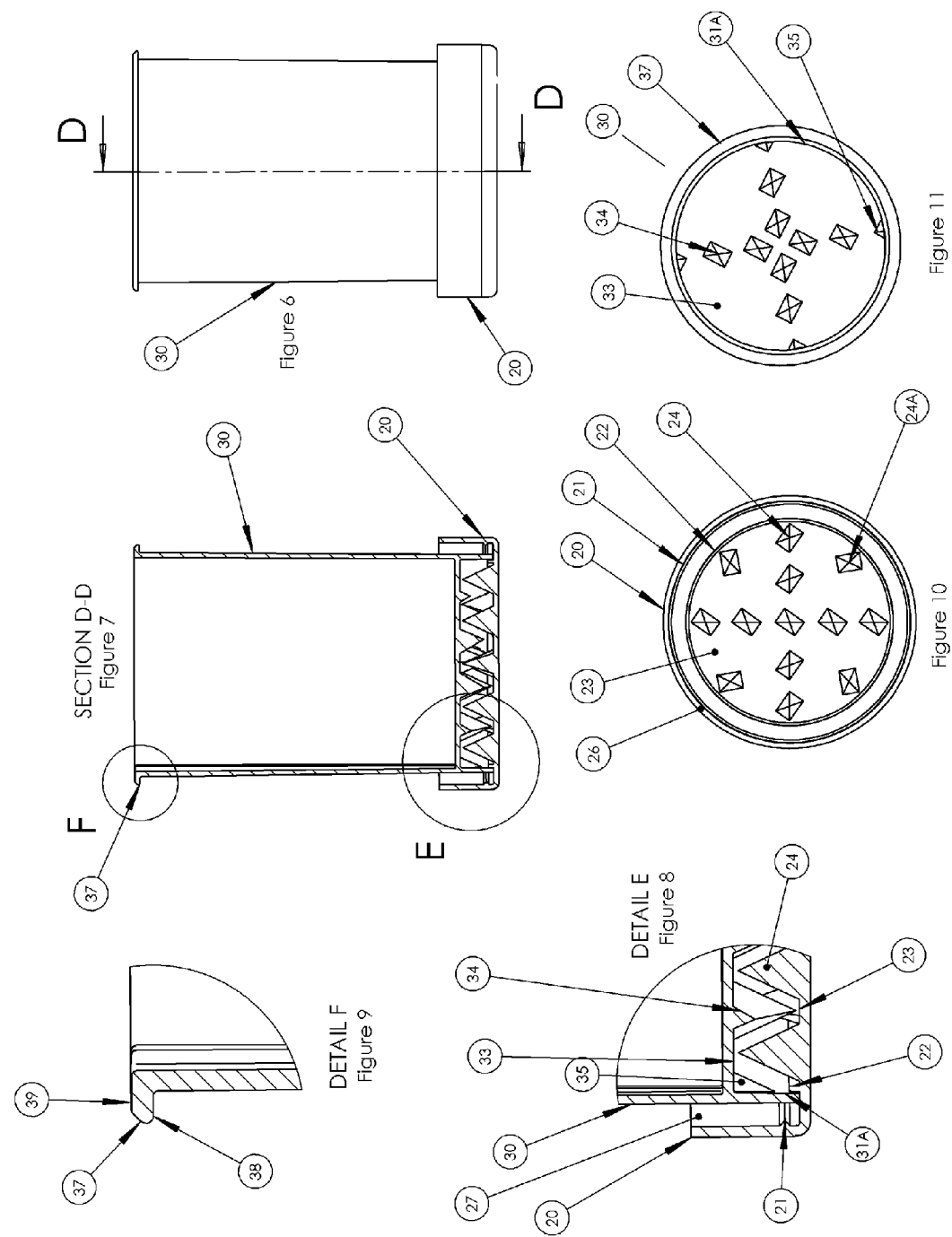

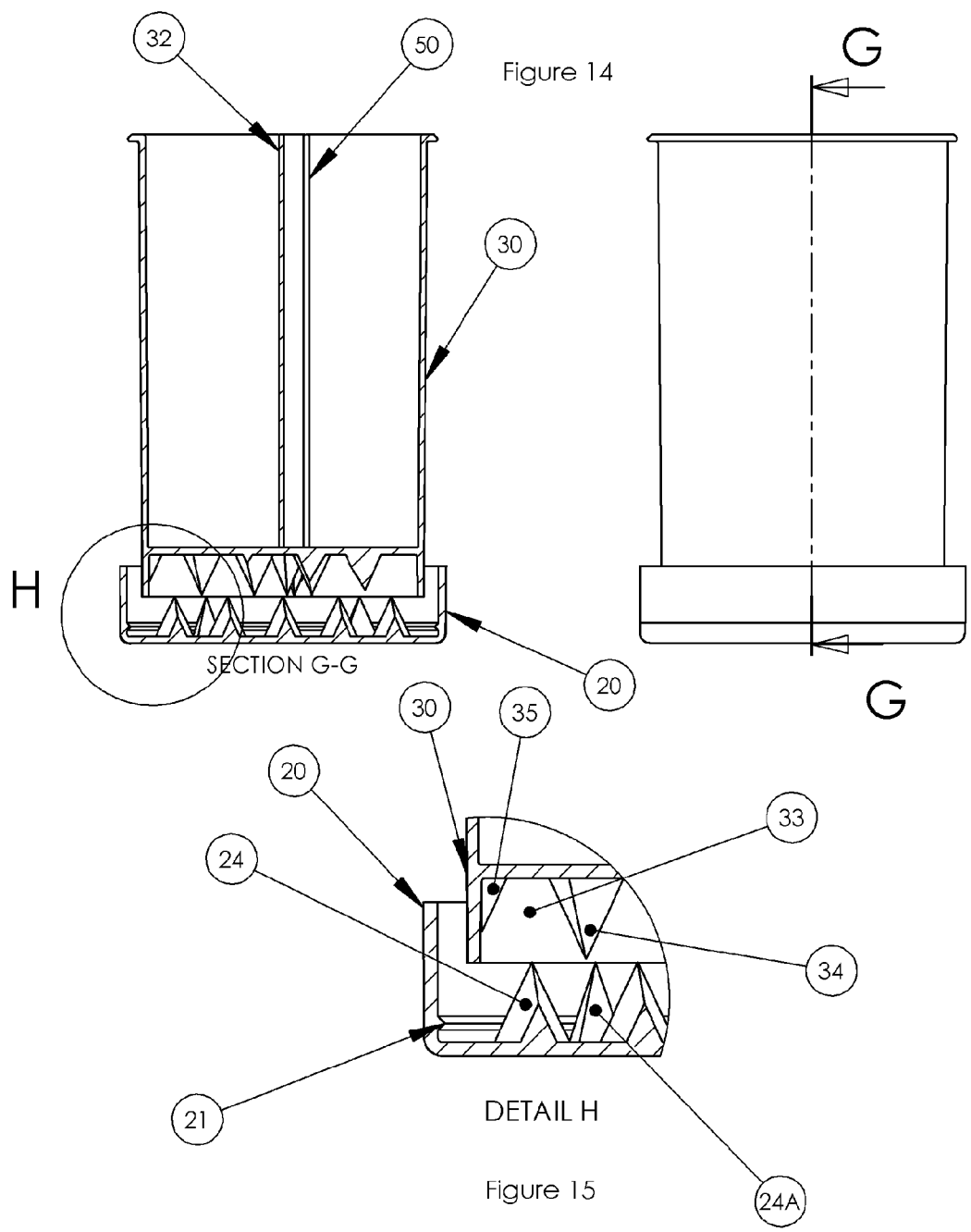

DEFOLIATING AND SHREDDING STORAGE DEVICE FOR AROMATIC HERBS AND METHOD FOR USE

BACKGROUND OF THE INVENTION

Figure 1:
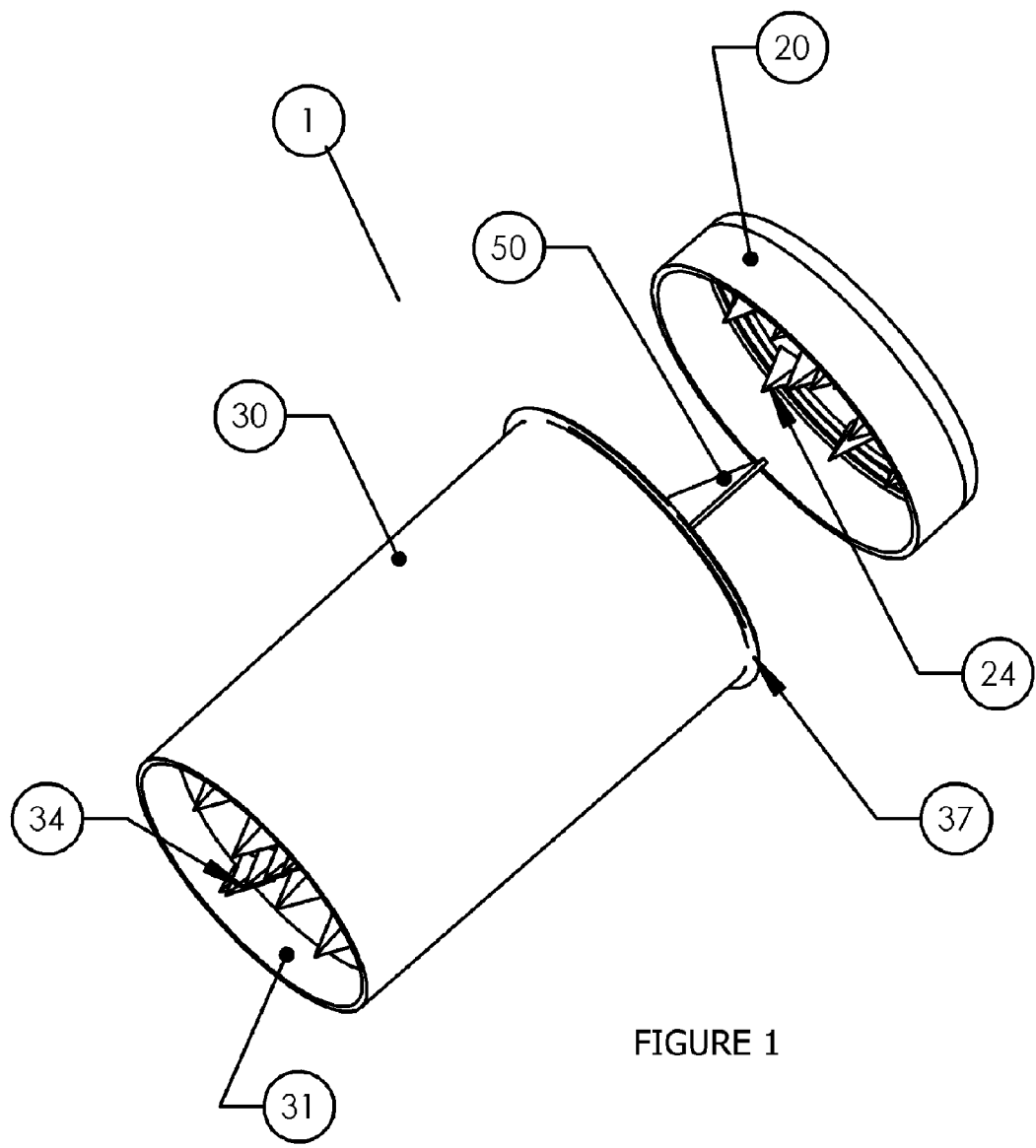

This invention is principally used for presenting aromatic herbs in a condition for maximum enjoyment. This device creates a side shearing force upon the herbs shredding or tearing them, along with defoliating the leaves from the stems, in such a manner to maximize the secretion of the essential oils contained there and of the aromatic nature of the herbs.

BACKGROUND OF THE INVENTION

It is widely known that one should tear the leaves of herbs and leafy produce, such as basil or lettuce, rather than sharply cutting them with a knife of shears. Tearing the leaves releases the essential oils that provide the flavor and essence of the herb. When one tears or shreds the herb's leaves, the plants natural defense mechanism attempts to repair the cells that have been attacked and secretes the essential or natural oils which helps it to heal, in much the same way as human flesh. A tear to the skin will heal faster than a slicing cut, as the human body will naturally produce many more reparative cells as when it is ripped than it is cut. With the promotion of using fresh herbs and produce by health professionals, especially organics, a product is needed to properly prepare fresh herbs for use.

Currently available prior art is replete with products that will grind dried herbs, and they are mostly made with metallic grinding surfaces. Once the herb is in a dried state, the essential oils have mostly been evaporated or dehydrated, precluding the ability of the preparer to "tear" or shred the herb. Grinding the herb at this stage is the accepted preparation technique prior to introducing it to the food.

But it is also established that metal can oxidize in the presence of certain naturally secreted oils causing a discoloration of the herb. This can be seen especially in leafy products such as lettuce, which easily turns brown when cut with a steel knife. Many chefs and food preparation guide suggest the use of plastic knives when herbs and leafy produce can not for, some reason, be torn or naturally shredded by hand. The prior art is full of examples of grinding devices that are made of metal due to the need to maintain hardened surfaces to grind dried herbs, nuts or spices. It is the presences of these metallic pieces that can cause oxidation between the ferrous of the steel and the oils of the fresh herbs.

It is easily seen in the prior art that herbs that are dried, do not require the special handling of the fresh herb as the naturally occurring oils and essences have been dried out through a dehydration period, either naturally or through a sped up manmade process. The dehydration process will concentrate the essences of the herb. Dried herbs are crushed or ground to release the remaining oils and essences that remain upon their use in food or medicinal preparations. To the contrary, fresh herbs should not be ground or crushed as the essential or naturally occurring oils and essences will be left on the surfaces of the grinding apparatus or allowed to evaporate into the ambient atmosphere, thereby reducing the effectiveness of the herb to flavor or heal. It is also seen that fresh herbs are generally presented to the user while still attached to their stems. This is so the naturally occurring capillary action will reduce the naturally occurring drying process which occurs when the stem is removed from the living plant. The grinding of fresh stems with the actual leaves will produce a herb that is affected by the presences of the bitter, fibrous stem. It is desirous, and often difficult, to remove the leaves from the stem.

It is important that stems are not included in the use of most naturally occurring herbs and leafy produce to provide the user with the essence that is located primarily in the leaves and not be subjected to the bitter, fibrous stem material. As fresh herbs will dry out when introduced to the ambient air, users will attempt to retard this process by placing the herbs on their stems in containers that prevent the herbs from drying out. Placing herbs in a low humidity cool environment is ideal but the current methods can lead to two issues; 1) close fitting plastic bags will lead to spoilage of the herbs as there needs to be some form of air movement about the herb to prevent mildew and 2) herbs need to be separated from other herbs as their essences are not always desired to be commingled. Though plastic is a desired storage vessel, many essential oils will forever "flavor" a plastic container preventing it's use for other purposes and high quality plastic ware is usually not economically viable for single use applications.

It is an object of this invention to create a storage device that has the purpose of not only storing the herbs in an environment conducive to herb storage but can also be used in the proper preparation of the herbs for their eventual use.

It is a further object of this invention to provide the user with a device that is capable of naturally tearing or shearing herbs in a manner to reduce the chance of grinding or unnaturally chopping of the herbs.

It is a further object of this invention to disclose shearing implements that are capable of tearing or shredding the herbs while maintaining the minimal contact surface area necessary of the shredding implements thereby reducing the probability of leaving the essential oils of the herbs on the device and not on the herb as with large smooth surfaces.

It is a further object of this invention to aid in the defoliation of the herb from their stems in such a manner that the stem is easily removed in it's relatively whole state.

It is a further object of this invention to have the tearing or shredding portion of the device to be part of the storage device, reducing pieces to be used, manufactured or lost thereby reducing the overall cost of the product.

It is also a further object of this invention to create a device capable of multiple storage compartments within said device.

It is a further object of this invention to create a device that is designed to be capable of single use without a significant detrimental effect upon the economic effectiveness of the device.

It is a further object of this invention is to have the device designed so that residue and remaining herbs are easily replaced back into the device reducing the chance of contamination and to preserve unused product.

SUMMARY DESCRIPTION OF THE DRAWINGS

In FIG. 1, the device is shown on an oblique plane in an exploded view, showing both halves of the shredding chamber, along with the divider being withdrawn.

In FIG. 2, the device is shown in a right side plan view.

In FIG. 3, the device of FIG. 2 has been cross-sectioned along the vertical axis of the device, detailing the interior of the device with the cap in the closed sealed position.

In FIG. 4, the detail shows the bottom shredding chamber and a detail of the shredding means, along with the optional slot for guiding the dividing means.

In FIG. 5, the detail of the interface between the cap and the body is shown.

In FIG. 6, the device is shown in a right side plan view where the cap has been inverted and placed onto the bottom of the device in the final shredding position to shred the herbs.

In FIG. 7, the device from FIG. 6 has been vertically cross-sectioned.

In FIG. 8, a detail of the lower portion of the body is shown showing the interface between the inverted cap, the shredding means and the shredding chamber.

In FIG. 9, a detail of the sealing flange of the upper portion of the body is shown.

In FIG. 10, the interior portion of the cap is shown detailing the shredding means.

In FIG. 11, the detail of the shredding chamber located at the lower portion of the body is shown along with the shredding means attached thereto.

Figure 13:
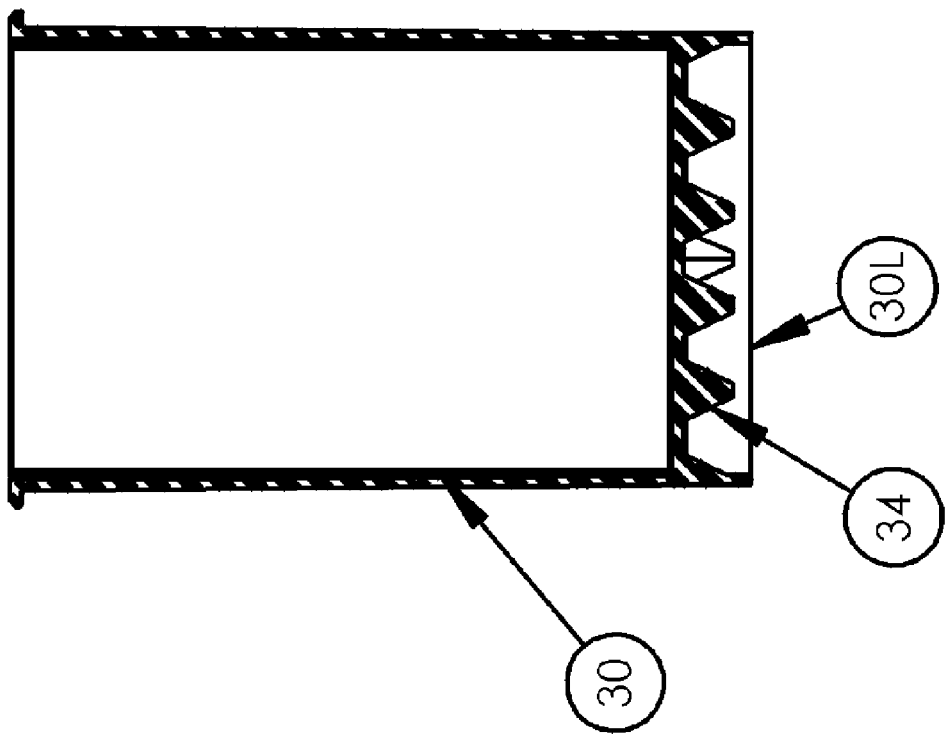
Figure 12:
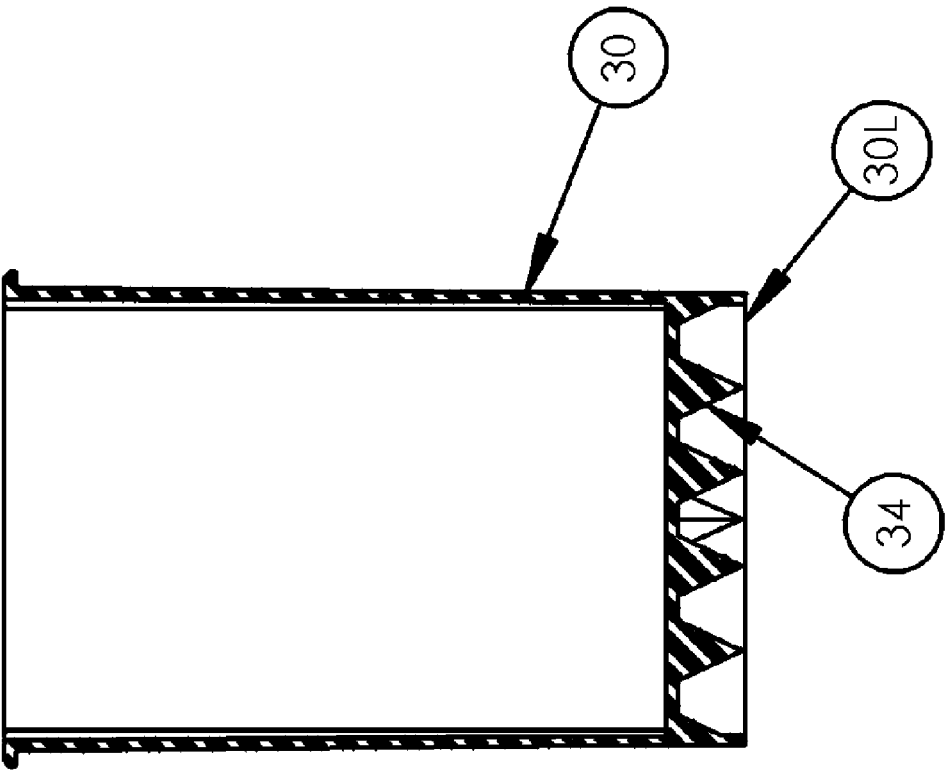

In FIG. 12 and FIG. 13, a detail is shown of the different disclosed shredding means.

In FIG. 14, a vertical cross-sectional view is displayed showing a divider in place along with the embodiment of the cap not having the centering ring in place. The cap is purposefully not completely engaged for clarity.

In FIG. 15, a detail view is blown up of the cap without the centering ring embodiment in a position nest to the shredding chamber.

DETAILED DESCRIPTION OF THE DRAWINGS

The particulars of the device as shown in the aforementioned figures are detailed in this section. It is noted and disclosed that this is only one method for practicing the objects of this invention and that similar devices that can be created using similar technologies are sought to be within the spirit and scope of this disclosure.

Device 1, as shown in FIG. 1 in it's exploded view, has a generally cylindrically shaped body 30 and associated cap 20, where body 30 has a shredding chamber 31 containing shredding means 34 and cap 20 contains a corresponding shredding means 24. Divider 50 is shown in an extended position for clarity purposes only. The interior of body 30 can be adapted to received a means for compartmentalizing the interior portion of said body into as many individual compartments as required by the user. In this disclosure, a single divider in the shape of a rectangular plane is used to segment the interior of body 30 into two compartments.

FIG. 2 shows the device in it's closed state, where cap 20 is securely attached to body 30. It should be noted that the means for securement of this cap 20 can be varied by it's application. Additional elements required to "child-proof" this cap can be adapted to this device. Said cap 20 can be threadably attached as well. In this instance, a snap ring 21 is shown in FIG. 5 to secure the cap 20 in place. FIG. 3 is a vertical cross-section of the device as shown in FIG. 2 and shows the interior 36 of body 30. Interior 36 has an equally shaped slot 32 positioned 180 degree across along the interior 36 of cylindrically shaped body 30 in this instance to accommodate the rectangular plane divider 50. Dividers that have alternate shapes can be accommodated with slot 32 being adapted accordingly in size, shape and number. Detail B of Section A-A is shown as FIG. 5.

FIG. 5 shows cap 20 in it's secured position retained by the interface between snap ring 21 and retaining lip 38. Cap 20 is has an exterior side 25, an interior side 23 and an overhang tab of sidewall 26. Snap ring 21 is located along the interior side 27 and is so located to provide a secure contact seal between the interior of cap 23 and the top of lip 39 of body 30, when snap ring 21 is in contact with the buttress 38. Buttress 38 is preceded by lead-in 37, located at the upper portion 39 of body 30, as detailed in FIG. 9, lead-in 37 shaped to allow snap ring 21 to slide thereover while the sidewall 26 flexes outwardly. Cap 20 is made of materials that will allow for sufficient flexation allowing the snap ring 21 slide over the lead-in yet have the resiliency to draw back to it's original shape securing cap 20 to body 30 as detailed in FIG. 5.

FIG. 5 also shows an embodiment of the invention in that the interior side 23 of cap 20 contains the cap shredding means 24 and centering ring 22. FIG. 15 shows an embodiment of the invention where the centering ring 22 is not present. It was found that some application require a more vigorous rotationally oriented or circumferential shredding motion rather than the more confined twisting back and forth motion when the centering ring is in place. The desired shaped for the shredding mean is one that will allow for the herb leaves to be shredded and the heavier stems to be stripped of their foliage. It is found through testing that means with sloped sides are best for defoliating and sharp points are best for tearing of the herb leaves. It is also found the means should not be so closely populated to inhibit the stems from separating and the leaves to be shredded rather than ground. In the following disclosed embodiments, the means are located along chords of maximum diameter intersecting at right angles, typically along the horizontal and vertical axes. This application discloses two styles of shredding means but other means are suitable having slopped sides with culminate in a sharp exposed end. In FIG. 13, which details one embodiment of this invention, it was determined that a frustoconical pentrahedrally shaped protrusion facilitated an optimal shredding action rather than a grinding or squeezing action which would harm the herbs. A petrahedral shape will mean that the herbs are in contact with angled edges, which aid in the grasping and releasing of the herb leaf as it ascends upperwardly along the protruded shape of the shredding means angled sides. The frustrum of the pentyrahedron allows for a smooth tear and can be biased in an manner to provide the maximum shredding surface to the presented to the herbs as they are rotationally introduced to each shredding meen. Another embodiment disclosed by this invention is using the pentrahedrally shaped protrusions but rather than frustocinically terminating the protrusion, the sides of the pentrahedron continue to a finite point as shown in FIG. 12. As is disclosed, other shapes including tetrahedrally shaped protrusions can be used in this invention. It is understood that other such shaped protrusions can be used so long as they exhibit similar characteristics as further described. FIG. 4 and FIG. 11 show shredding means 34, having additionally located devices 35, that are bi-sections of the shredding means 34, that are attached to the vertical wall of the chamber to assist in the total movement of the herbs during the process of shredding them. It is designed to prevent herbs from being "trapped" against the smooth sidewalls, where the herbs would be allowed to "run" along the wall surface precluding the ability to be shredded.

Protrusions of the shredding means 24 and 34 are biased on their respective interior surfaces 23 and 33 to facilitate the rotational action of the cap and body, and enabling the herb to have the maximum amount of face contact with the means to "grab" at the herb tearing it from the stems and associated pieces of the same leaf. FIG. 10 and FIG. 11 shows the interior of cap and the shredding chamber respectively, where the shredding means are rotationally aligned, or biased, to optimize the shredding or tearing action of the means, rather than simply grinding the herbs against opposing surfaces. The biasing also facilitates the defoliation of the stems from the leaves in this same manner. In this current disclosure, as is shown in FIG. 8, it is shown that the shredding means protrusions do not come in contact with each other nor do they come into contact with the opposing interior surface. It is a design purgative to set the distance between the opposing interior surfaces and the shredding means, so as to accommodate varying types of herbs and varying degrees of shredding or tearing. The location of the shredding means throughout the interior surfaces are designed to maximize the shredding achieved by the device, along with facilitating the movement of the herbs within the chamber, thereby preventing the herbs from accumulating along the sides of the chamber and to prevent clumping of the herb which decreases the efficiencies of which the herbs are shredded or torn. It is also disclosed in one embodiment that the interior 23 of lid 20 has additional shredding means 24A located circumferential between the two intersecting ranks of shredding means.

The method for use of this device entails removing cap 20 from it's location upon the top of body 30. User then dispenses the desired amount of herb into the interior 23 of cap 20. The user then positions the caps so that the interior 23 of cap 20 is located directly opposite of chamber 31 and user brings the cap into proximal contact with lower end 30L of body 30, thereby containing the herb to be prepared, desirably completely within the chamber 31. User begins a rotational circumferential action of the cap onto the body 30 using a slight pressure bringing the two pieces into contact. The user circumferentially guides the cap around the lower end of body 30 while also rotating the actual cap, causing the herbs to come in contact with the shredding means. The user, through gentle compressive and rotational pressure, condenses and thusly shreds the herbs, while completely containing the herbs in the chamber until the interior 23 of cap 20 is in complete contact with the lower end of body 30 as shown in FIG. 8. It is noted that should the embodiment include the centering ring 22, the ring 22 provides a centering presence thereby guiding the cap 20 into correct position maximizing the shredding of the herbs in chamber 31. Ring 22 is sized so that there is no interference between ring 22 and the interior walls of chamber 23, yet allows for a de minimis amount of lateral movement when the ring 22 is engaged against interior of chamber wall 23. The user continues to rotate and shred the herb until the degree of fineness is accomplished and the defoliation is accomplished. The presence of the centering ring 22 will allow the user to more surely confine the herbs to be shredded but does not allow for a circumferential rotation of the body 30 along the outer reaches of the interior of cap 20. At that time, user shall dump out the shredded contents into an appropriate container for use. The cap is replaced upon the top of body 30, in this embodiment, applying pressure until the snap ring 21 is engaged under buttress 38. The remaining herb residue is able then to be replaced back into the interior of body 30, conserving the unused portion.

This invention uses a device that is constructed of plastic, which facilitates a disposable nature of the product. The device is designed to be injection molded, thereby allowing the manufacture to produce a disposable product or one that is capable of multiple uses and cleanings, dependant only upon the type of plastics used. It is also foreseen that a thin metallic cylindrical body can be stamped.

What is claimed is:

1. A Defoliating and Shredding Storage Device for Aromatic Herbs comprising
    a circular top lid, said lid having an exterior and an interior portion, said interior portion containing a shredding and defoliating means, said lid having attachment means, and
    a body, said body being cylindrically shaped, having an exterior and an interior portion, having a proximal end and a distal end, said distal end having a cooperating attachment means to said attachments means of said top lid, said body having a containment bottom inwardly located from said proximal end creating a chamber, said chamber having an inner diameter and an outer diameter, said outer diameter being less than the exterior diameter of said top lid, and where said top lid contains a centering ring circumferentially displaced about the rotational center of said interior portion of said top lid, said ring having an inner ring diameter and an outer ring diameter, said outer ring diameter having a diameter that is de minimisly smaller than said inner diameter of said chamber.

2. A Defoliating and Shredding Storage Device for Aromatic Herbs as in claim 1 where said interior of said body is capable of receiving at least one dividing member, said member extends principally from said containment bottom to said distal end.

3. A Defoliating and Shredding Storage Device for Aromatic Herbs as in claim 1 where said attachment means is a flanged snap ring.

4. A Defoliating and Shredding Storage Device for Aromatic Herbs as in claim 1 where said attachment means is helically threaded.

5. A Defoliating and Shredding Storage Device for Aromatic Herbs as in claim 1 where said chamber is defined by vertical walls and a horizontal floor, said floor and said walls being adapted to receive a shredding and defoliating means.

6. A Defoliating and Shredding Storage Device for Aromatic Herbs as in claim 1 where said shredding and defoliating means consists of a plurity of separate individual protrusions, said protrusions radially located along the vertical and horizontal axis of the centerline of said lid and said chamber.

7. A Defoliating and Shredding Storage Device for Aromatic Herbs as in claim 6 where said protrusions are frusto-conical pentrahedrally shaped.

8. A Defoliating and Shredding Storage Device for Aromatic Herbs as in claim 6 where said protrusions are pentrahedrally shaped.

9. A Defoliating and Shredding Storage Device for Aromatic Herbs as in claim 6 where said protrusions are rotationally biased to maximize surface area in contact with material to be shredded.

10. A Defoliating and Shredding Storage Device for Aromatic Herbs as in claim 6 where additional said protrusions are arranged equidistantly along the interior circumference of said top lid.

* * * * *